US 6,751,839 B2

(12) United States Patent
Germani

(10) Patent No.: US 6,751,839 B2
(45) Date of Patent: Jun. 22, 2004

(54) METHOD OF FORMING A HEX NUT FROM A PLANAR MATERIAL

(76) Inventor: Marc D. Germani, 110 Washington Park, #7, Newtonville, MA (US) 02460

( * ) Notice: Subject to any disclaimer, the term of this patent is extended or adjusted under 35 U.S.C. 154(b) by 28 days.

(21) Appl. No.: 09/729,680

(22) Filed: Dec. 4, 2000

(65) Prior Publication Data

US 2002/0067976 A1 Jun. 6, 2002

(51) Int. Cl.$^7$ .............................................. B21D 35/00
(52) U.S. Cl. ...................................... 29/469.5; 72/379.2
(58) Field of Search ........................... 72/379.4, 379.2, 72/335, 339; 413/24; 29/469.5, 428; 470/25, 5.6; 411/429

(56) References Cited

U.S. PATENT DOCUMENTS

| | | | |
|---|---|---|---|
| 788,532 A | * | 5/1905 | Higgin |
| 1,450,583 A | * | 4/1923 | Ferry |
| 1,899,715 A | | 2/1933 | Olson |
| 3,748,674 A | | 7/1973 | Powell et al. ............... 10/72 R |
| 3,762,205 A | * | 10/1973 | Franz |
| 4,114,218 A | | 9/1978 | Pendell ...................... 10/86 R |
| 4,123,961 A | | 11/1978 | Chaivre et al. ................ 85/35 |
| 4,281,786 A | | 8/1981 | Krueger ....................... 228/116 |
| 4,347,636 A | | 9/1982 | Capuano ...................... 10/86 F |
| 4,416,142 A | | 11/1983 | Thorne-Thomsen ......... 72/348 |
| 4,647,263 A | | 3/1987 | Macfee, Jr. et al. .......... 411/82 |
| 4,755,090 A | | 7/1988 | Macfee, Jr. et al. .......... 411/82 |
| 4,832,551 A | | 5/1989 | Wollar ........................ 411/280 |
| 5,000,847 A | * | 3/1991 | Huang |
| 5,154,102 A | * | 10/1992 | Becker |
| 5,419,043 A | * | 5/1995 | Laue |
| 5,445,483 A | | 8/1995 | Fultz ............................. 411/181 |
| 5,461,948 A | | 10/1995 | Perrero, Jr. ................... 81/128 |
| 5,548,893 A | | 8/1996 | Koelfgen ............... 29/888.011 |
| 5,617,652 A | | 4/1997 | Müller .......................... 36/134 |
| 5,673,472 A | | 10/1997 | Müller ....................... 29/432.1 |
| 5,927,920 A | | 7/1999 | Swanstrom ................ 411/180 |
| 6,079,922 A | | 6/2000 | Ross et al. ................. 411/180 |
| 6,347,900 B1 | * | 2/2002 | Sadakata |

FOREIGN PATENT DOCUMENTS

| | | |
|---|---|---|
| GB | 585948 | 3/1944 |
| JP | 8-291702 | 5/1996 |

OTHER PUBLICATIONS

Translation of Japan 8–291,702.*

* cited by examiner

Primary Examiner—Flemming Saether
(74) Attorney, Agent, or Firm—Chapin & Huang, L.L.C.; Christopher J. Lutz, Esq.

(57) ABSTRACT

A hex nut formed from cutting and deforming a rigid planar material and having an integral attachment surface continuous with the deformable planar material allows attachment of the hex nut to any suitable surface. A rigid planar material such as a piece of flat metal is cut according to a particular pattern. The particular pattern includes each of the sides of the hex nut and one or more attachment surfaces as a continuous shape. The flat metal is then deformed, or bent, along certain lines to form a hex nut, or other polygonal shaped object. The attachment surface or surfaces, which extend from the sides of the hex nut, are then secured to a surface of a rotatable object, such as by adhesion or spot welding, or other suitable methods. In this manner, the hex nut can be engaged by a receptacle such as a wrench for rotating the hex nut and consequently, the object which is attached through the attachment surface.

9 Claims, 23 Drawing Sheets

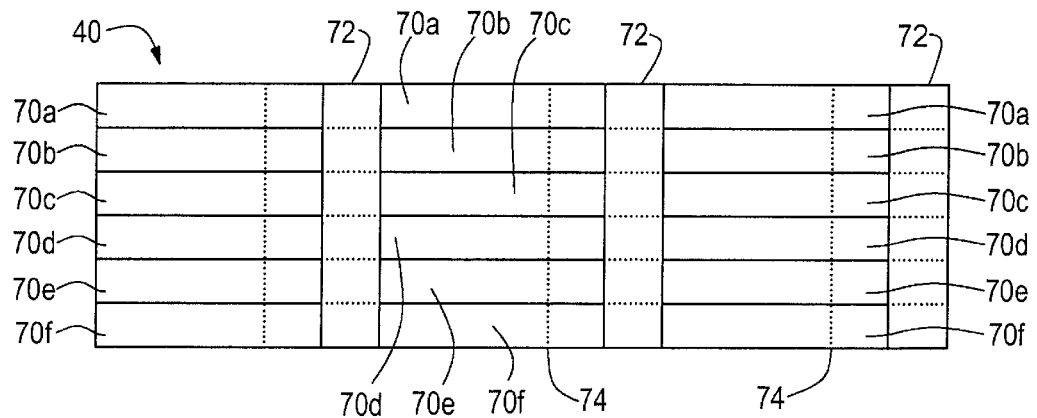
FIG. 6a
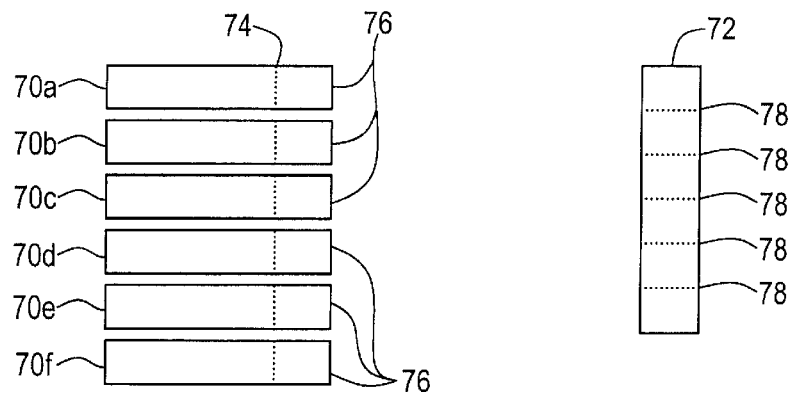
FIG. 6c
FIG. 6b

FIG. 13a
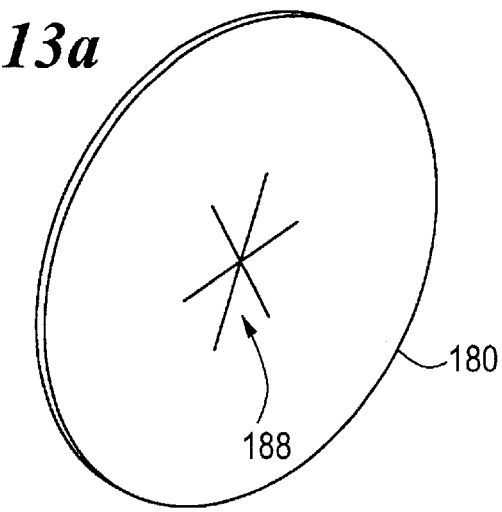
FIG. 13b
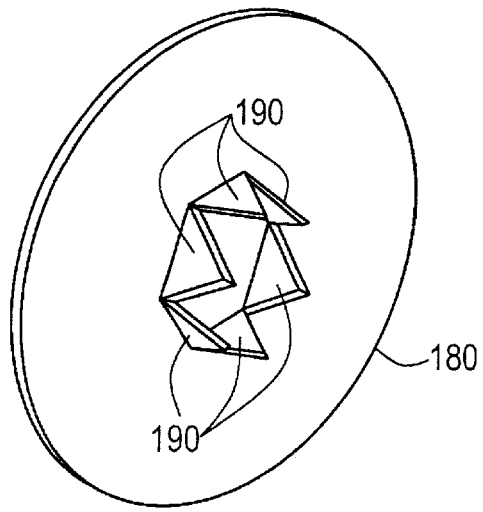
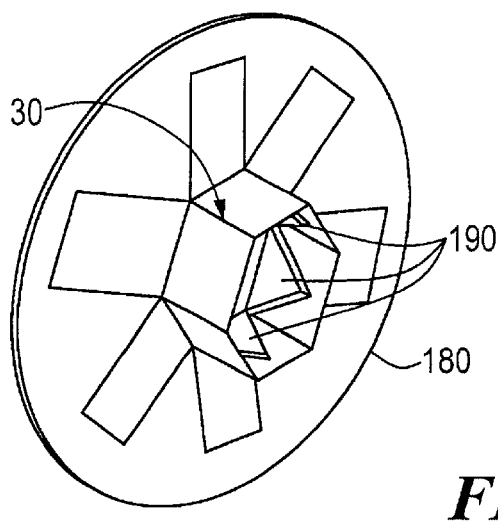
FIG. 13c

METHOD OF FORMING A HEX NUT FROM A PLANAR MATERIAL

BACKGROUND

Hex nuts are known which are used to secure a variety of items via a threaded member such as a bolt. The hex nut includes a cylindrical, threaded interior which corresponds to the threads on the threaded member. Rotation of the hex nut about the threaded member drives the hex nut along the threaded member, typically towards another hex nut or blunt portion such as a bolt head. Securing of the items occurs by evacuating a hole in the items to be secured. The hole is larger than the threaded member, yet smaller than the hex nut or blunt portion. The threaded member is inserted through the hole in each of the items, and the hex nut rotated to drive the hex nut along the threaded member. As the hex nut is rotated, the items are frictionally engaged between the hex nut and the blunt portion. As the hex nut is further rotated, the frictional forces become substantial, tending to compress and shear the hex nut and the items so secured, thereby securing the items.

As the frictional forces increase, additional rotational torque is required to continue rotating the hex nut. Often a receptacle such as a wrench is employed to engage the hex nut. The receptacle engages the sides of the hex nut in close proximity such that the hex nut cannot rotate independently while engaged in the receptacle. Such a receptacle is typically attached to a extended member such as a handle or rod. The extended member allows additional leverage to be applied to the rotation of the hex nut via the receptacle. In this manner, the hex nut allows substantial rotational torque to be applied through a common receptacle such as a wrench.

In many contexts, however, the additional rotational torque provided by a hex nut would be desirable. Many items, such as automotive oil filters, threaded fluid containers, and others, employ threaded communication with an item. Traditional hex nuts, however, are freestanding objects, and cannot be used to direct rotational torque to another object. An attempt to fasten a hex nut to an object to be rotated is likely to have insufficient surface area to provide attachment sufficient to transfer the rotational torque to the object. Factors such as differences in materials and the available fastening area on the surface of the hex nut are likely to result in a fastening that is insufficient to transfer the rotational torque without shearing off the hex nut from the surface of the object to be rotated. Further, manufacturing costs are likely to be infeasible for more substantial fastening.

Accordingly, it would be beneficial to provide an engageable member in a hex nut or other polygonal shape which has an integral attachment surface for attachment to a rotatable object; which is fabricated from an integral, continuous material to increase strength and reduce manufacturing cost, and which can withstand the torque generated from a rotating receptacle by which it is engaged.

SUMMARY

An engageable member defined by a plurality of continuous rigid surfaces can be formed from a rigid, deformable planar material. A plurality of linear deformations in the planar material between each of the rigid surfaces define a convex edge in the deformable planar material, such that each of the rigid surfaces is substantially opposed to at least one other of the rigid surfaces. At least one integral attachment surface is also formed from the deformable planar material such that it is continuous with at least one of the rigid surfaces and adapted to be attached to a rotatable object.

The engageable member appears as a hex nut or other polygon formed from cutting and deforming the rigid deformable planar material and has an integral attachment surface continuous with the deformable planar material to allow attachment of the engageable member to any suitable surface. The rigid planar material such as flat metal is cut according to a particular pattern. The particular pattern includes each of the sides of the engageable member and one or more attachment surfaces in a continuous shape. The flat metal is then deformed, or bent, along certain lines to form an engageable member having the shape of a hex nut, or other polygonal shaped object. The attachment surface or surfaces, which extend from the sides of the hex nut, are then attached to a surface of a rotatable object, such as by adhesive, spot welding or other suitable method. In this manner, the hex nut can be engaged by a receptacle such as a wrench for rotating the hex nut and consequently, the rotatable object which is attached through the attachment surface.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIGS. 6a–6f show another embodiment of an engageable member formed from a continuous, repeatable pattern;

FIGS. 13a–13c show the intermediate surface of FIGS. 12a–12d with an alternate embodiment of attachment to the engageable member.

DETAILED DESCRIPTION OF THE INVENTION

A description of preferred embodiments of the invention follows.

Figure 1B:
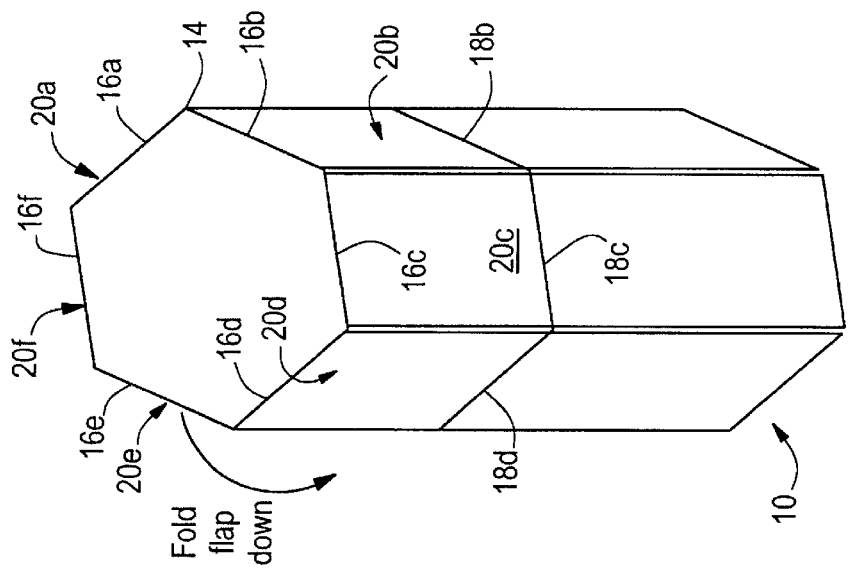
FIGS. 1a–1d show a hex shaped engageable member formed from a planer material having elongated legs.
Figure 1A:
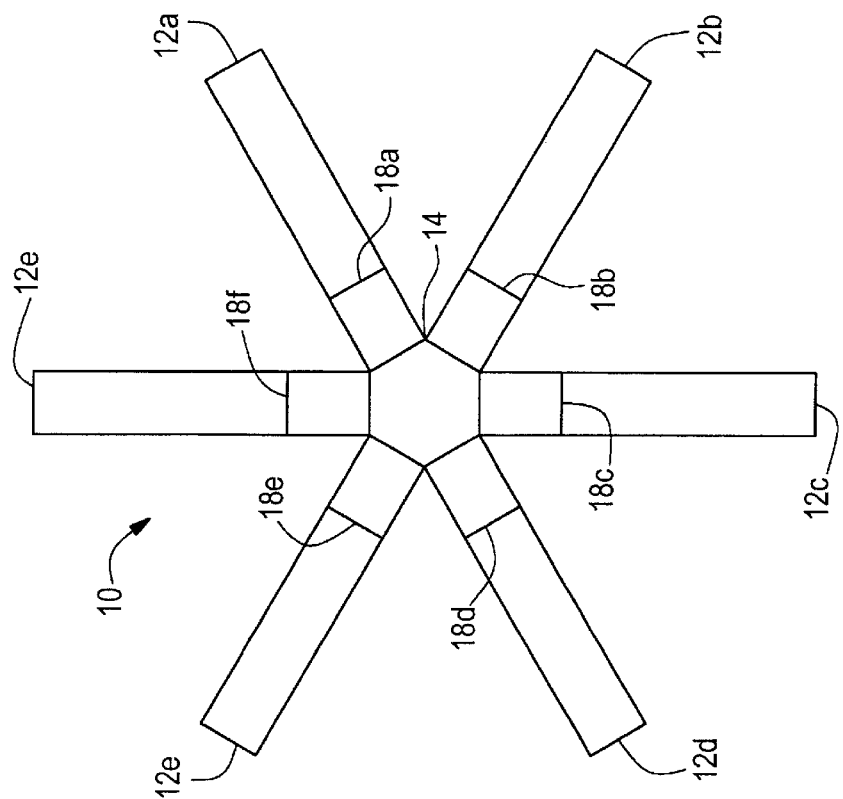
Figure 1D:
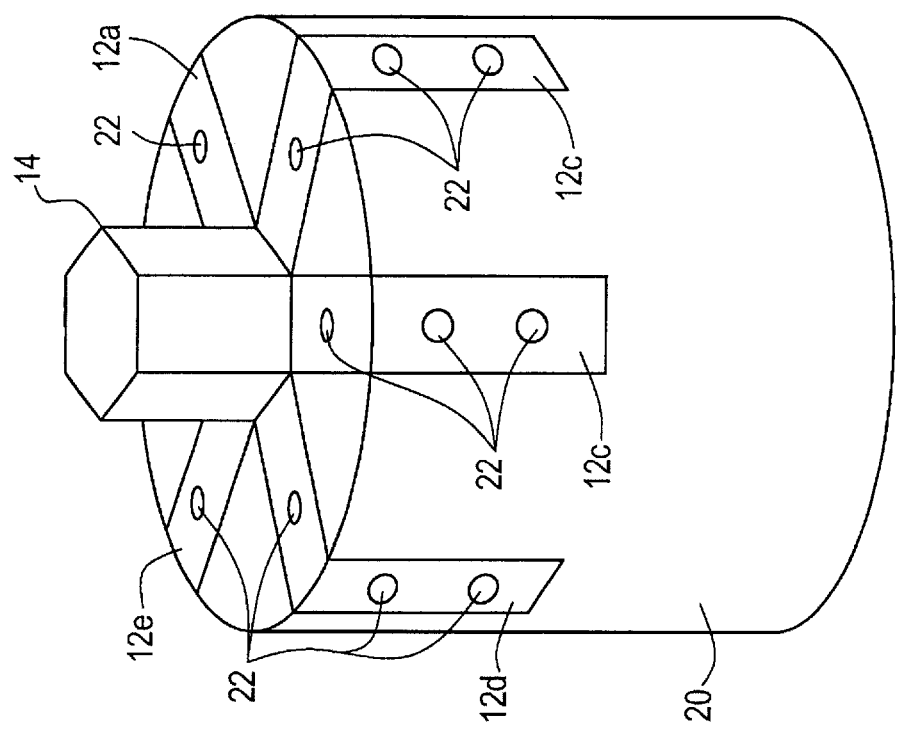

FIGS. 1a–1d show a hex nut shaped engageable member having elongated legs to facilitate attachment to a rotatable object. Referring to FIGS. 1a–1d, the hex nut shaped engageable member 10 is shown. The engageable member 10 is cut from a deformable planar material according to a predetermined pattern defining a star shape, as shown in FIG. 1a. A plurality of elongated legs 12a–12f extend radially from a central hub 14. The central hub 14 is hexagon shaped to correspond with the sides of the finished hex nut shaped engageable member shown in FIG. 1c. Alternatively, the central hub defining the finished shape could be another polygonal shape having a plurality of substantially opposed sides, such as four or five. An alternate embodiment with a varying number of sides can be engaged by a corresponding receptacle having sides corresponding to at least two of the sides of the engageable member, so as to prevent independent rotation of the engageable member while engaged in the receptacle.

FIG. 1b shows the engageable member 10 in a partially completed state. Referring to FIG. 1b, the elongated legs 12a–12b have been deformed downward along deformable edges 16a–16f, thereby defining the opposed sides 20a–20f, corresponding to the hex shape of the central hub 14.

Figure 1C:
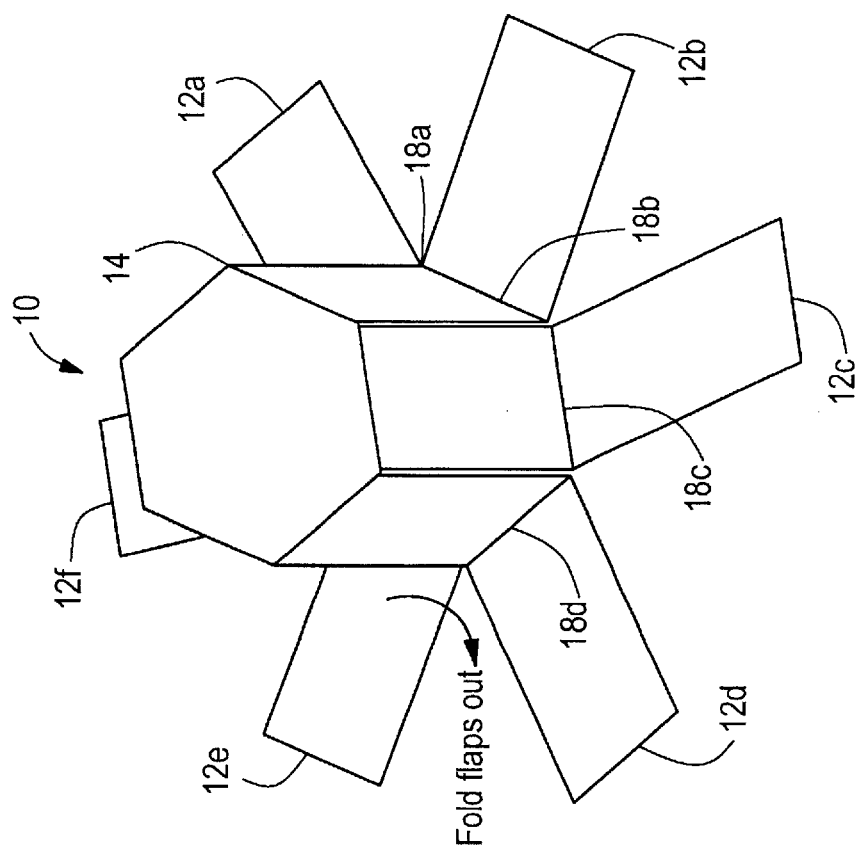

Referring to FIG. 1c, the elongated legs 12a–12f are deformed along deformable lines 18a–18f. The elongated legs 12a–12f are deformed to extend radially from the central hub 14. In this manner, the elongated legs 12a–12f form an attachment surface adapted to be secured to a rotatable object (not shown) for rotation via the hex nut shaped engageable member 10. In a particular embodiment, shown in FIG. 1d, the rotatable object is an automotive oil filter 20 attached to the elongated legs 12a–12f via any suitable method, such as via spot welds 22. The elongated legs may define a concave surface adapted to be attached to a convex surface.

Figure 2A:
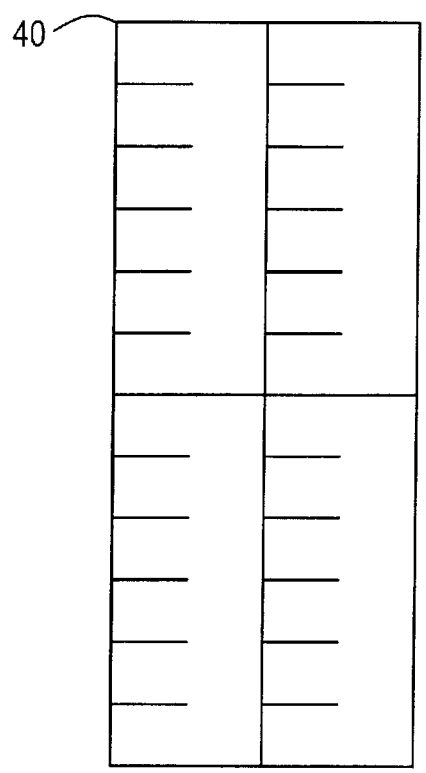
FIGS. 2a–2d show a hex shaped engageable member formed from a planer material cut in a repeatable, continuous manner.
Figure 2B:
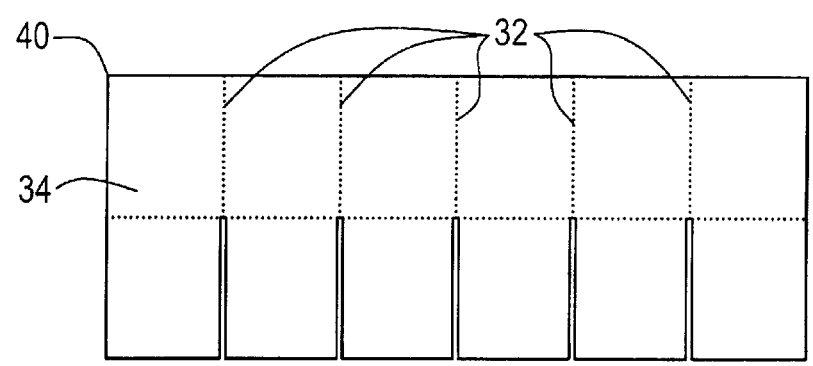
Figure 2C:
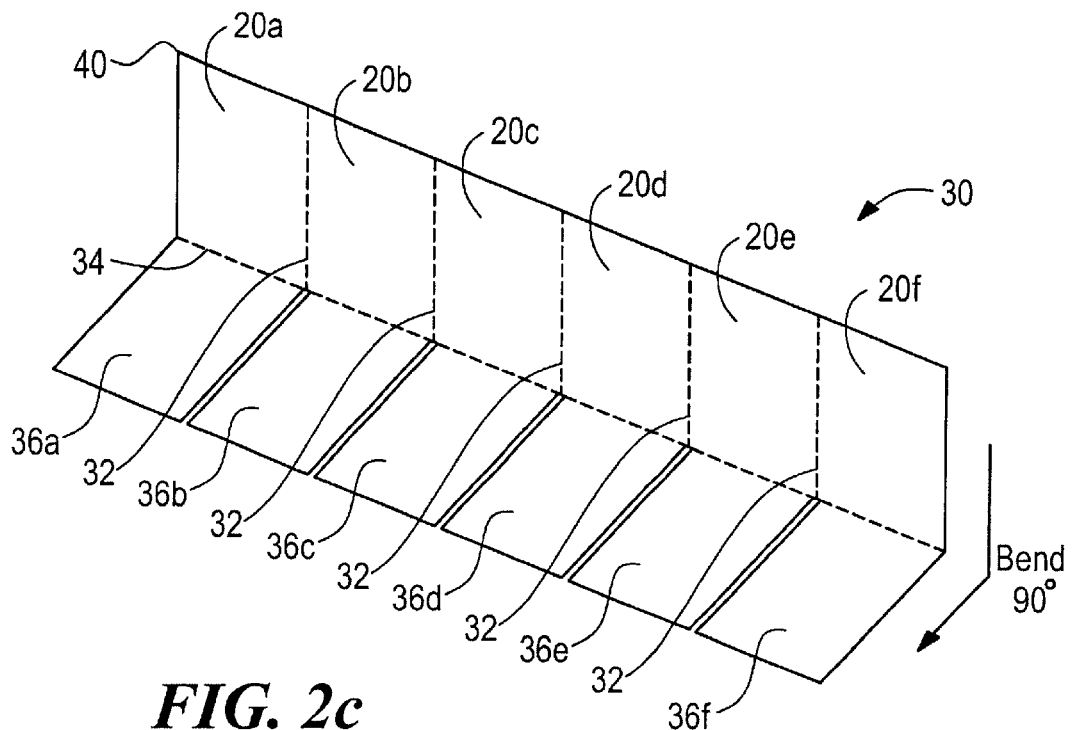
Figure 2D:
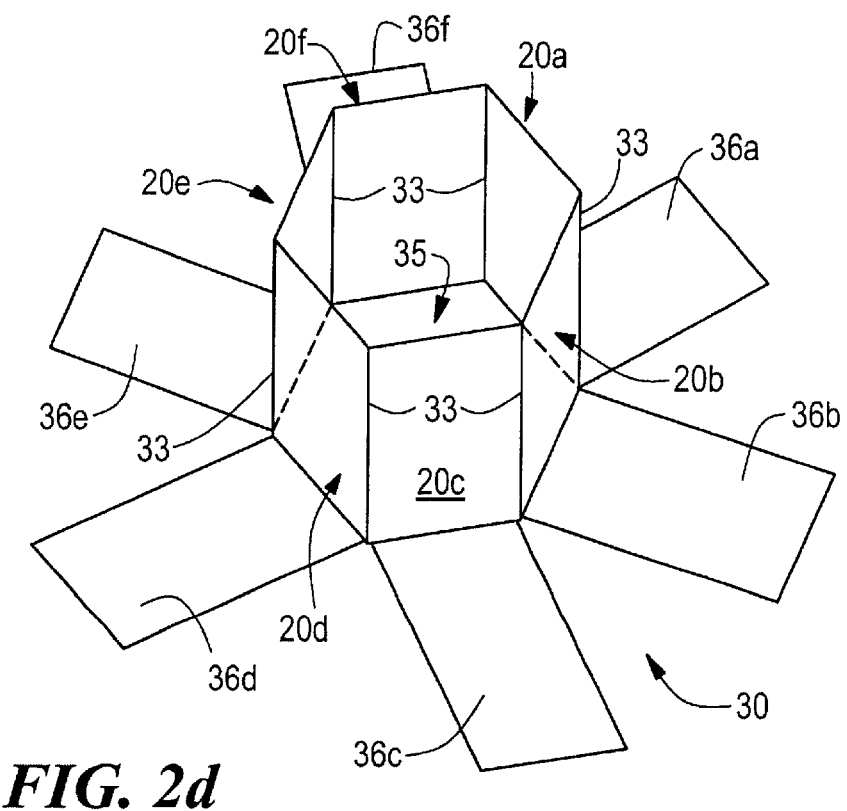

In another particular embodiment, shown in FIGS. 2a–2d, the hex nut shaped engageable member is formed from a repeatable, continuous pattern in the deformable planar material. The repeatable, continuous pattern minimizes waste from unused portions of the deformable planar material between the cutouts of the hex nut shaped engageable member. Referring to FIGS. 2a–2d, the engageable member 30 is cut from the pattern shown in FIG. 2a. The repeatable, continuous pattern shown in FIG. 2a allows all of the deformable planar material to be utilized. Referring to FIG. 2b, a segment 40 of the deformable planar material is cut partially across along parallel lines 32. Referring to FIG. 2c, the deformable planar material 40 is deformed along the dotted line 34, defined by a line perpendicular to the end of the cutting of the parallel lines 32, thereby forming the integral attachment surfaces 36a–36f. The deformable planar material is then deformed along the parallel lines 32 to form outside convex edges 33 substantially evenly spaced apart from each other and defining an interior polygon 35 with substantially opposed sides 20a–20f. In the embodiment shown, each of the opposed sides 20a–20f is disposed substantially 120° with respect to the adjacent side, thereby forming a hexagon, however other polygons can be formed by varying the number of sides.

Figure 3B:
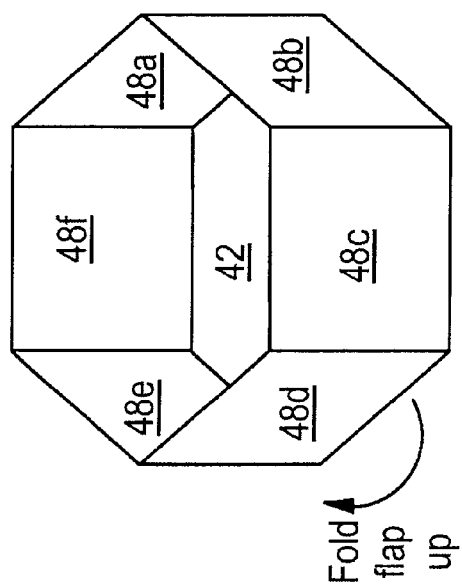
FIGS. 3a–3b show a hex shaped engageable member formed from a planar material having a center portion adapted for adhesion to a surface.
Figure 3A:
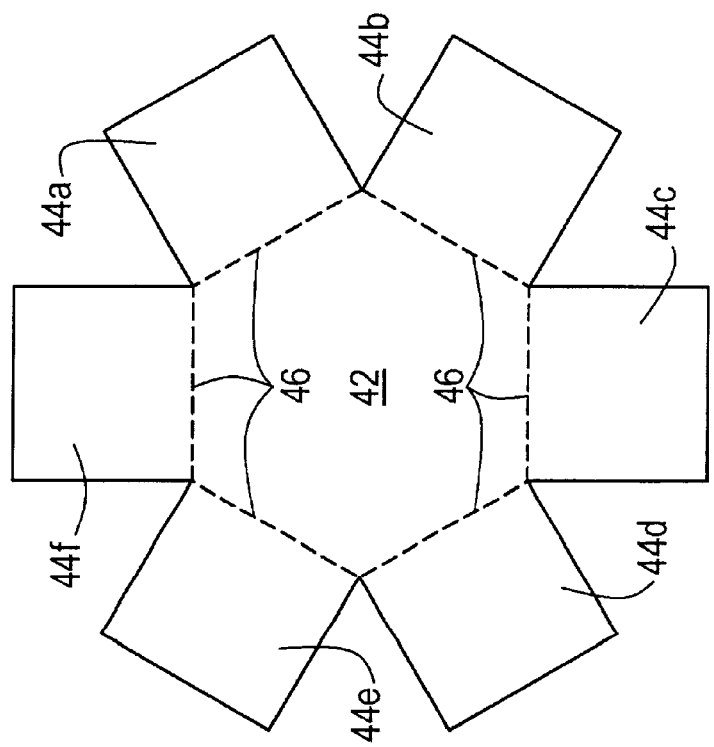

FIGS. 3a–3b show a particular embodiment adapted to be attached via a center hub 42. A star shaped pattern is cut in the deformable planar material, similar to that shown in FIG. 1 having shorter members 44a–44f radiating from the center hub 42. The members 44a–44f are deformed along the dotted lines 46 until disposed substantially perpendicular to the plane center in which hub 42 lies, forming opposed sides 48a–48f, as shown in FIG. 3b. As described above, a hexagon shape is defined, although other polygons could be employed by varying the number of members 44 radiating from the center hub 42. The center hub 42 is adapted to be secured to a working surface of a rotatable object by any suitable means, such as spot welding. The rotatable object may then be rotated by engaging two or more of the opposed sides 48a–f with a suitable receptacle.

Figure 4A:
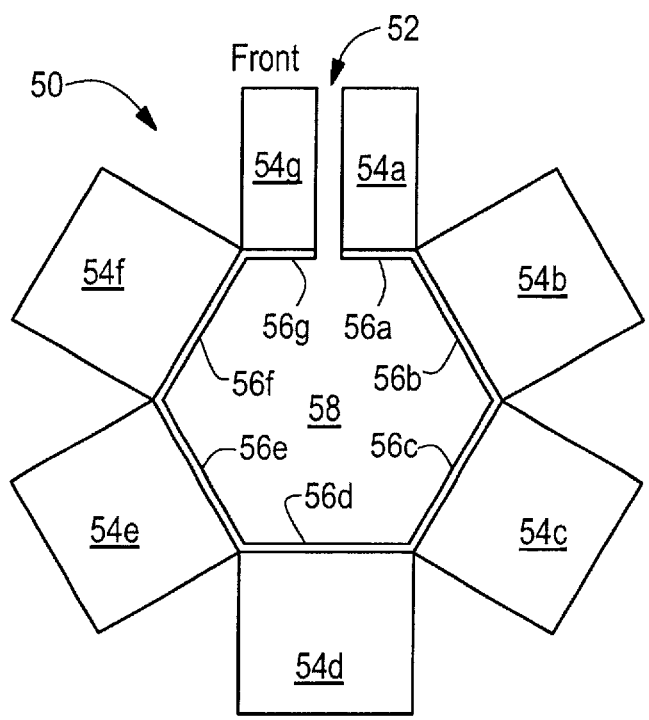
FIGS. 4a–4b show a hex shaped engageable member formed from a planar surface having a seam offset from an edge of the hex surface.
Figure 4B:
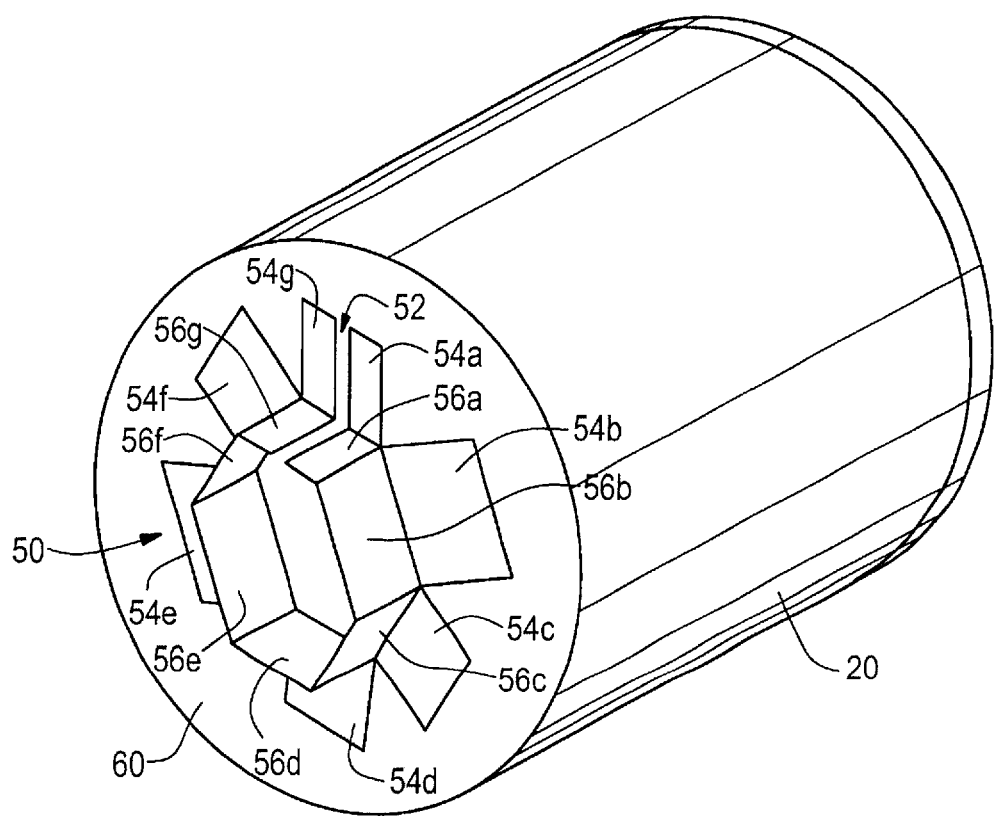

FIGS. 4a–4b shows a particular embodiment wherein the discontinuous portion along the opposed sides is offset so as to be disposed in the center of one of the opposed sides. By offsetting the discontinuous portion to the center of one of the disposed sides, all of the deformed edges remain continuous. Providing a continuous edge promotes strength since the edges tend to absorb much of the force when engaged by a receptacle. Referring to FIG. 4a, an engageable member 50 is formed in a configuration similar to the embodiment shown in FIGS. 2a–2d. The discontinuous portion 52, however, defined by the cutting of the deformable planar material, is disposed in the center between sides 54a and 54g. Further, the discontinuous portion 52 extends between sides 56a and 56g. Therefore, sides 56a and 56g effectively define a common opposed side with respect to the opposed sides 56b–56f which define the polygonal shape 58. Each of the members 54a–54g is adapted for attachment to a rotatable surface 60 such as the end side of a standard oil filter 20. In this manner, each of the edges between the sides 56a–56g remains continuous to increase the torque and shear which may be tolerated by the engageable member.

Figure 5:
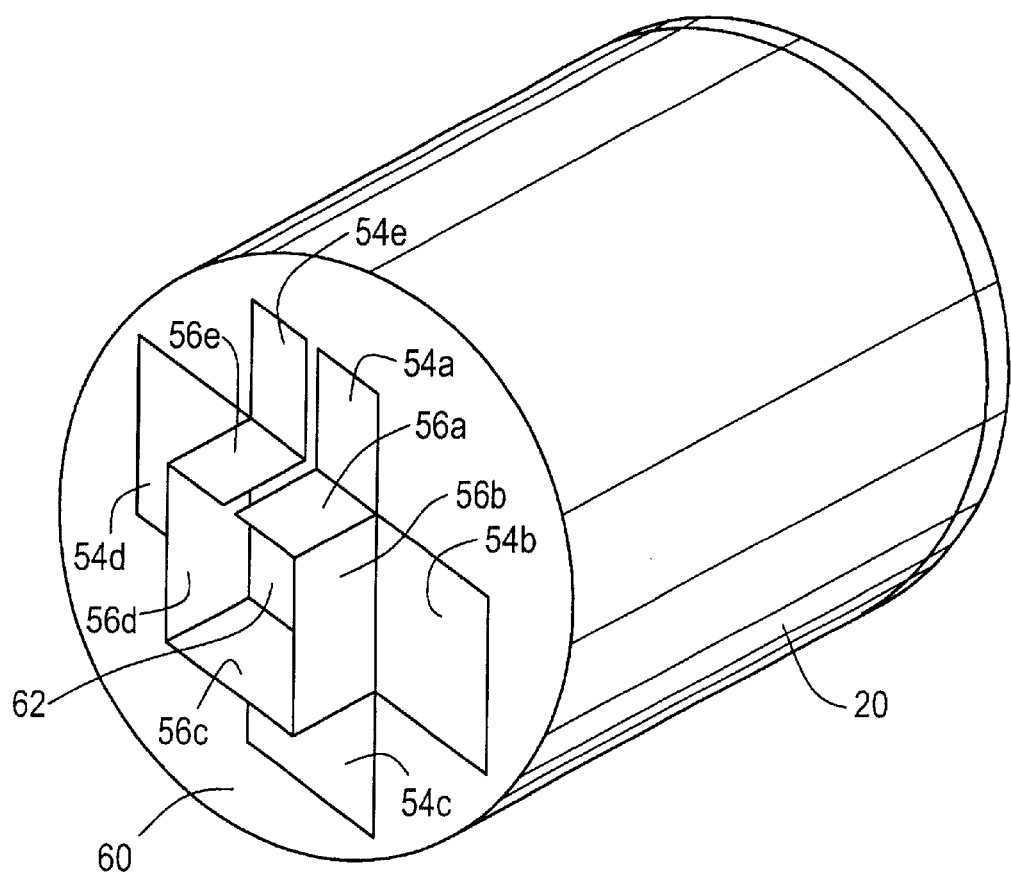
FIG. 5 shows a square shaped engageable member with an offset seam.

FIG. 5 shows another particular embodiment having a discontinuous portion, or seam, along one of the sides in which the interior of the polygon is adapted to receive a square insertable member such as a socket wrench. As in FIGS. 4a–4b, the members 54a–54e are secured to a rotatable surface 60, such as the end side of a standard oil filter 20. The sides 56a–56e are oriented in an opposed manner to define a four sided polygon. The four sided polygon 62 is adapted to receive a similarly shaped member such as a standard socket wrench. In this embodiment the receptacle is defined by the interior of the polygon and the engaging receptacle defined by a polygon adapted to be inserted in the interior of the polygon 62.

Figure 6D:
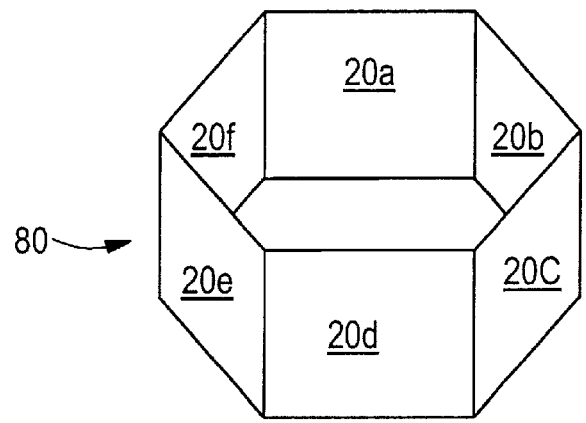
Figure 6E:
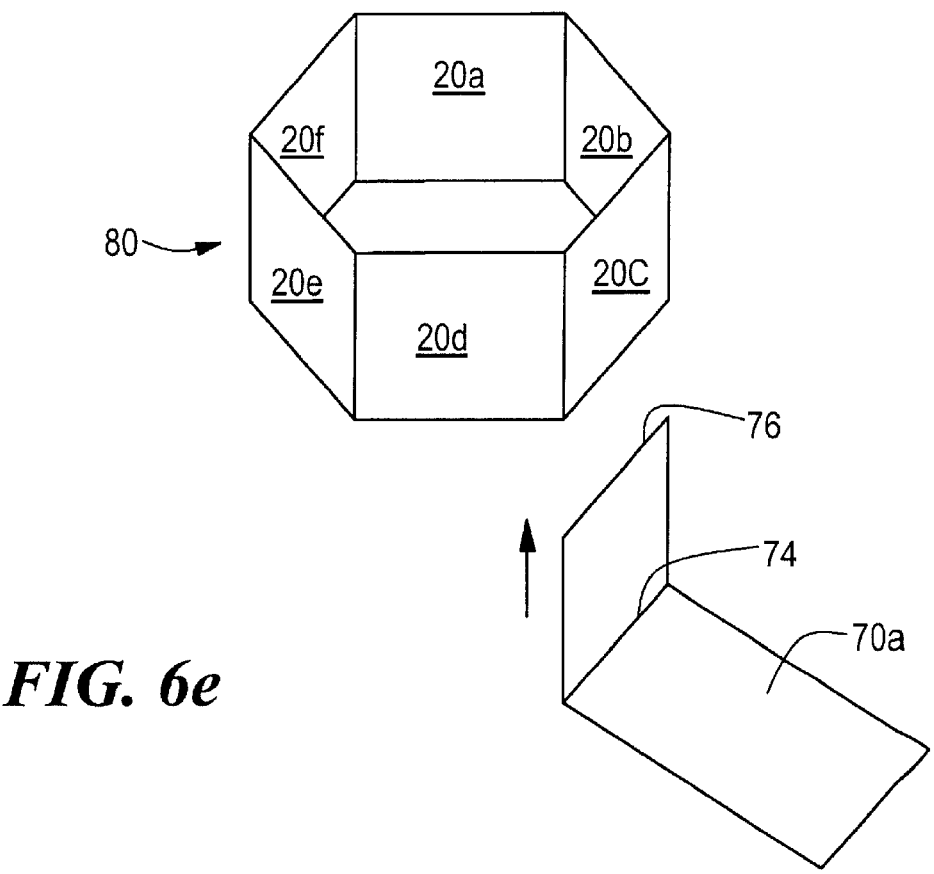
Figure 6F:
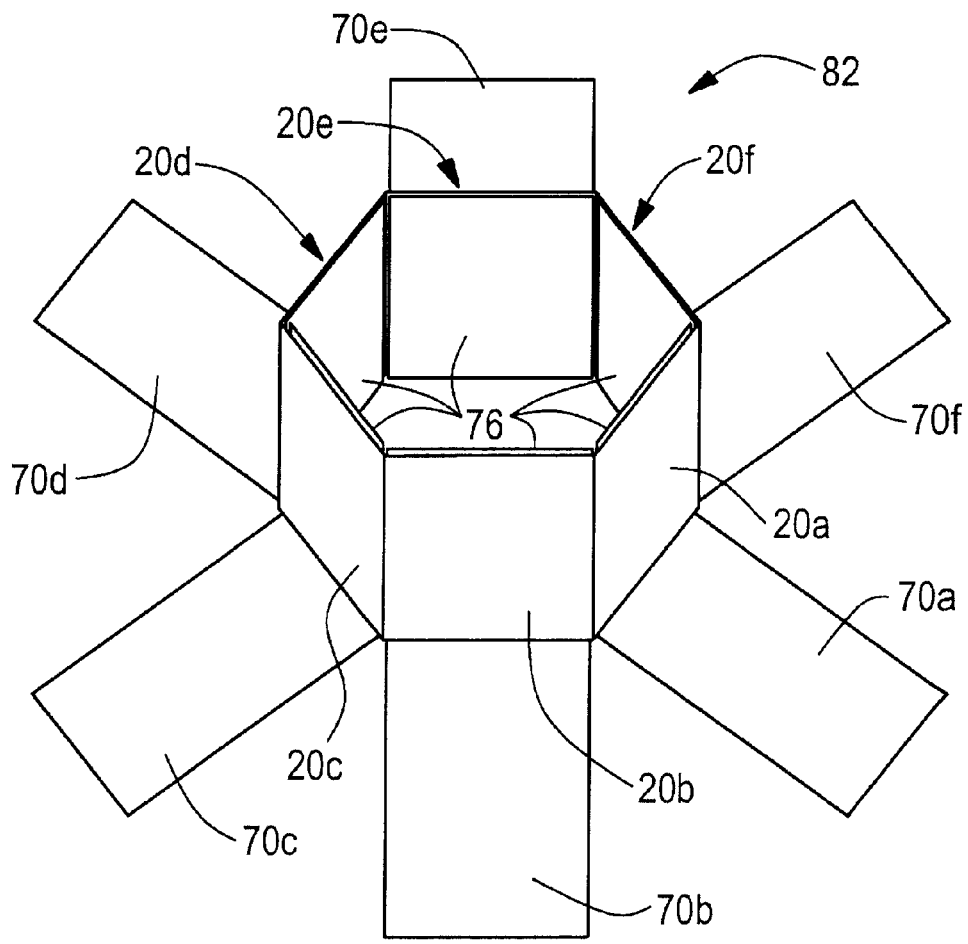

FIGS. 6a–6b show yet another embodiment in which a continuous, repeatable pattern is employed in fabricating the engageable member. Referring to FIGS. 6a and 6b a plurality of legs 70a–70f are cut from the deformable planar material 40. A polygonal body portion 72 is also cut from the portion between the legs 70a–70f. A bend line 74 is defined on each of the legs 70a–70f, and corresponds to the width of the polygonal body portion 72. Referring to FIG. 6c, each of the legs 70 is deformed in a perpendicular manner to form an attachment portion 76. Referring to FIGS. 6b and 6d, the polygonal body portion 72 is deformed at substantially equal distances and angles along bend lines 78 to form a polygonal shape 80 comprising a plurality of opposed sides 20a–20f. Each of the opposed sides 20a–20f has a width corresponding to the width of the legs 70a–70f. Referring to FIG. 6e, each of the legs 70a–70f is attached to a corresponding one of the opposed sides 20a–20f of the polygonal body portion 72 at the attachment portion 76. The legs may be attached by any suitable means, such as adhesive or spot welding, and may be attached to either the interior or exterior of the polygonal shape 80. Referring to FIG. 6f, the resulting engageable member 82 is strengthened from the double walls comprised of the opposed sides 20a–20f of the polygonal body portion 72 and the attachment portion 76 of legs 70a–70f.

Figure 7A:
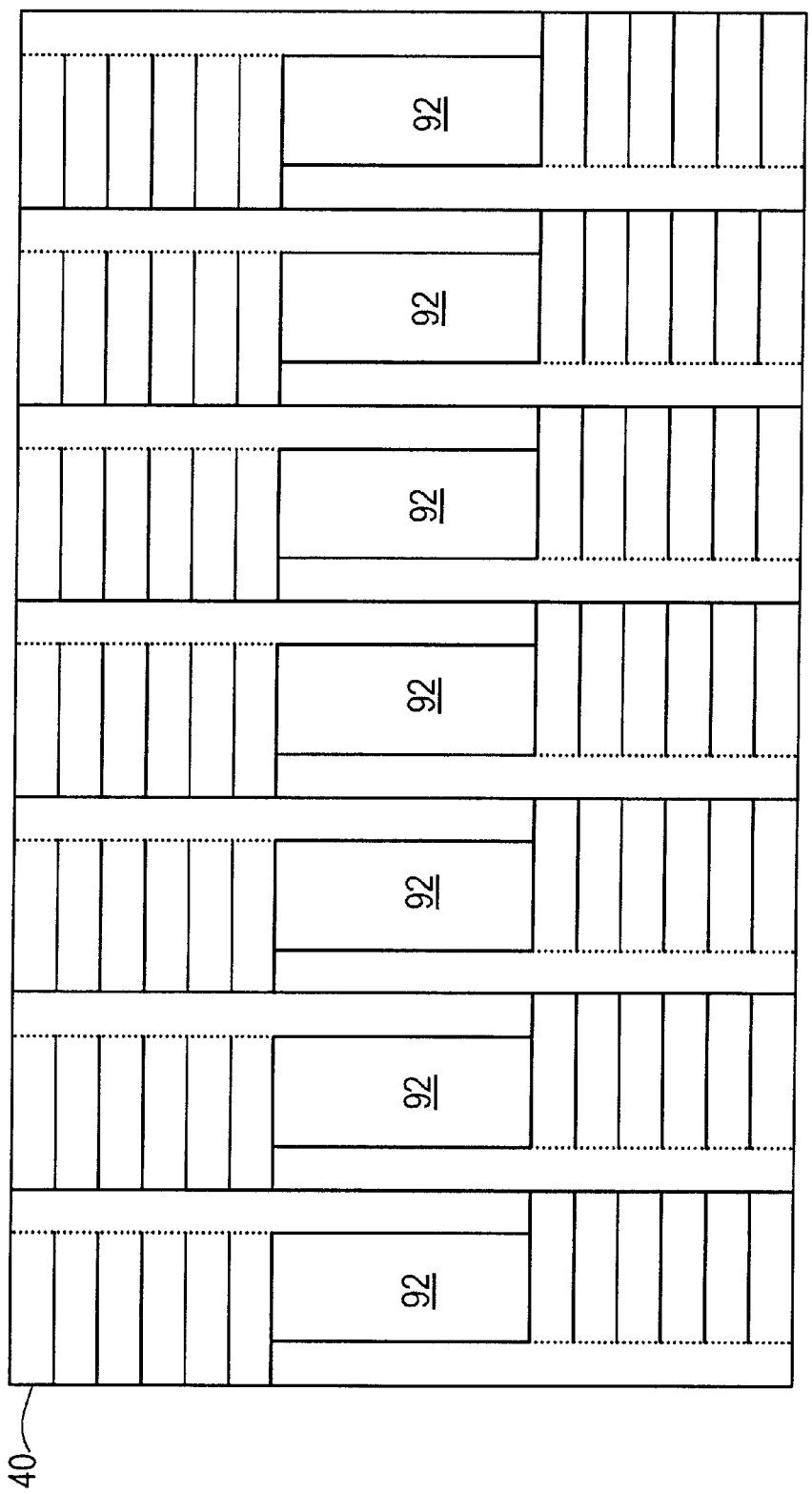
FIGS. 7a–7f show a hex shaped engageable member with a strengthening bar.
Figure 7C:
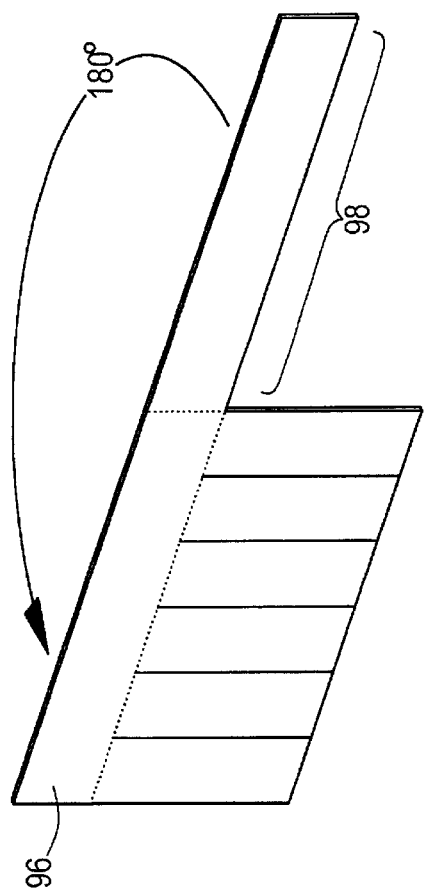
Figure 7D:
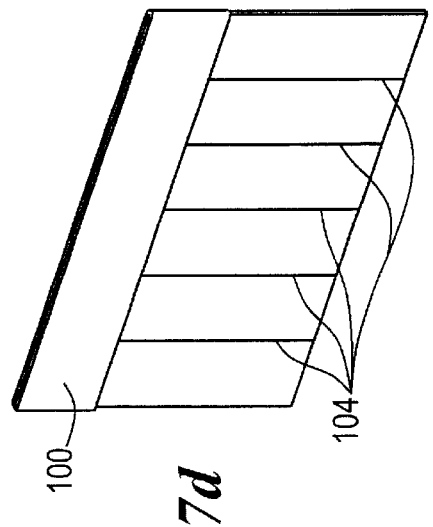
Figure 7B:
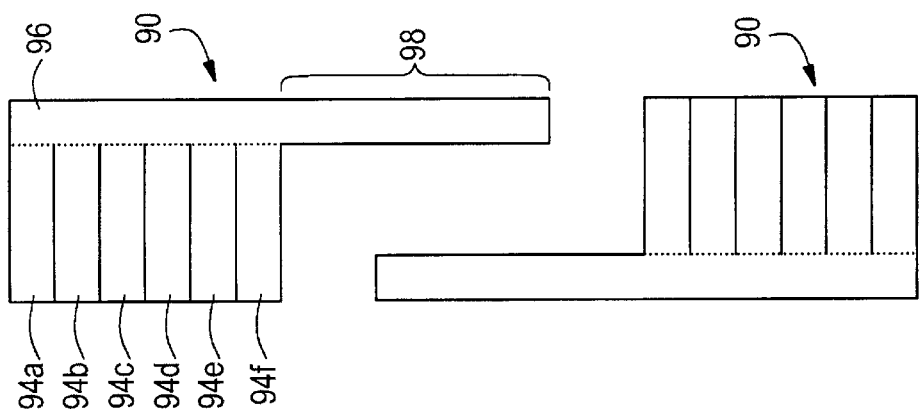
Figure 7F:
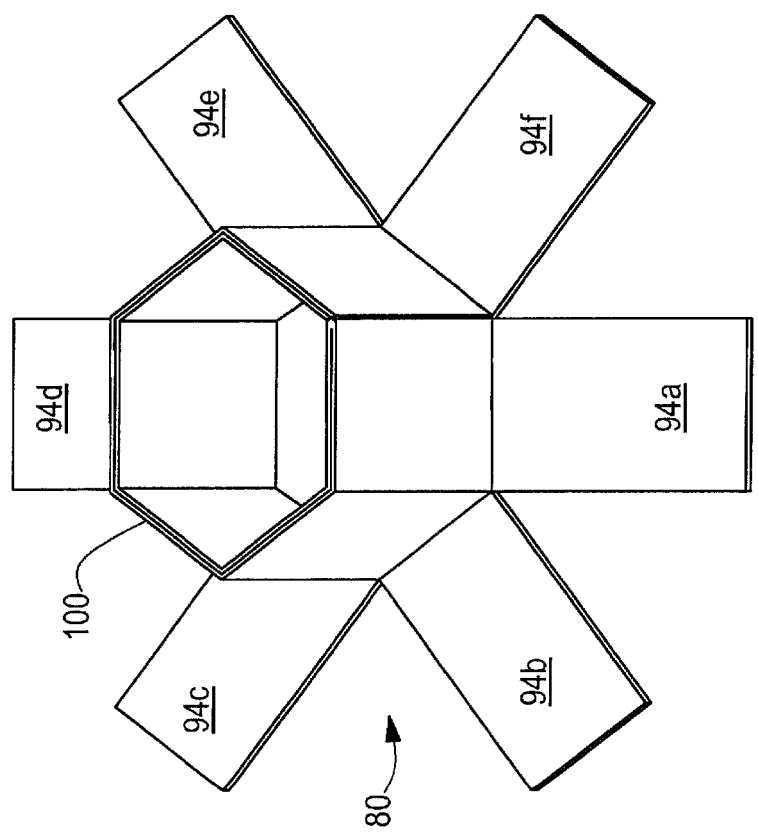
Figure 7E:
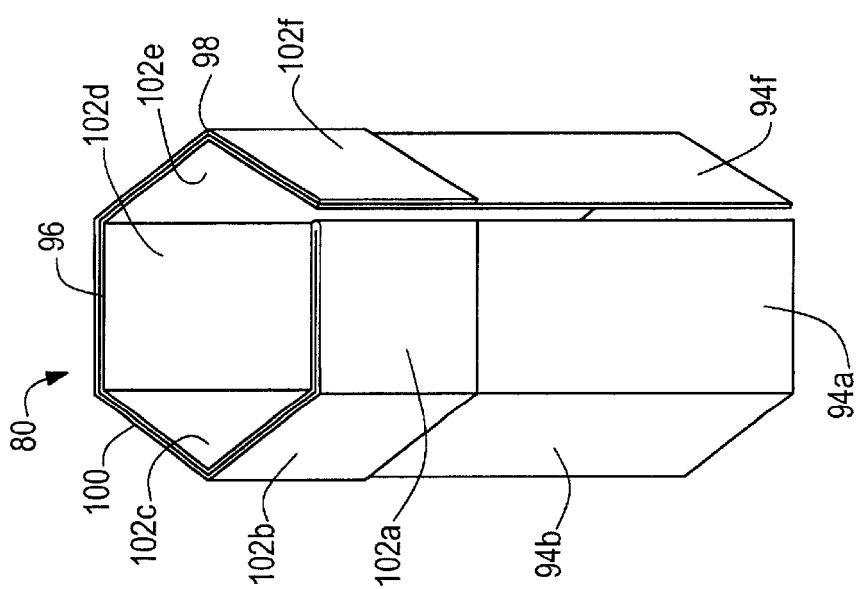

FIGS. 7a–7f shows an alternate embodiment employing a strengthening bar to strengthen the opposed sides of the hex shape. Referring to FIGS. 7a and 7b, a plurality of portions 90 are cut from a sheet of the deformable planar material 40. A waste portion 92 between the portions 90 is discarded. Each portion 90 has legs 94a–94f extending from a spine 96. The spine includes an integral, continuous strengthening bar 98 defined by the material extending beyond the legs 94. Referring to FIGS. 7c and 7d, the strengthening bar 98 is deformed 180° back over the spine 96, thereby forming a double walled portion 100. The double walled portion 100 is then deformed along the cut lines 104 of legs 94a–94f into a polygonal shape 80 having opposed sides 102a–102f defined by the legs 94a–94f. Referring to FIG. 7f, the legs 94a–94f are deformed outward so as to form an attachment surface to be attached to an object for rotation. In this manner, the double walled portion 100, when deformed in to the polygonal shape 80 provides a strengthened hex nut shape so as to absorb additional shear and compressive forces against the opposed sides 102a–102f when engaged by an engaging member.

Figure 8A:
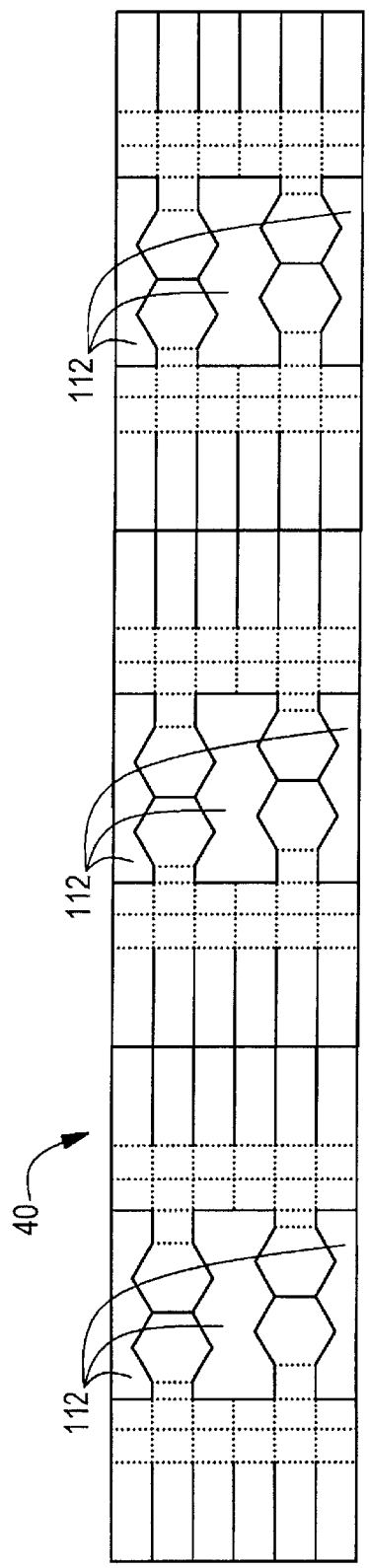
FIGS. 8a–8h show an alternate embodiment having integral polygonal reinforcement panels on the interior of the polygon.
Figure 8B:
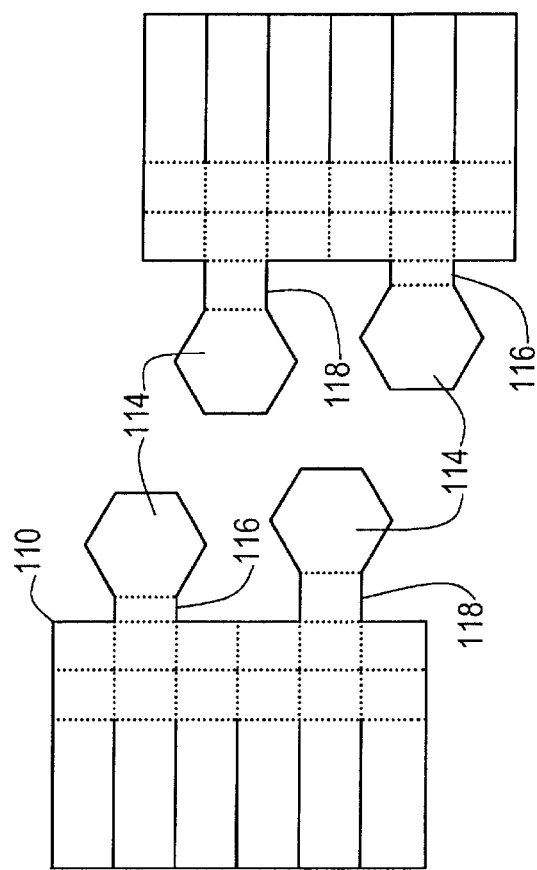
Figure 8C:
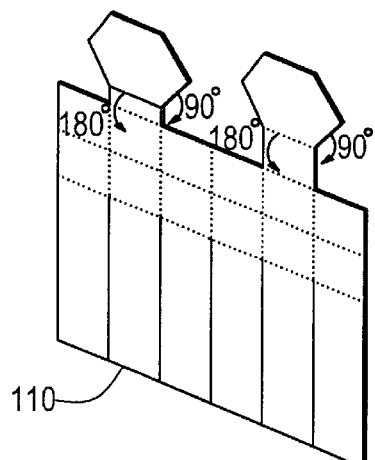
Figure 8D:
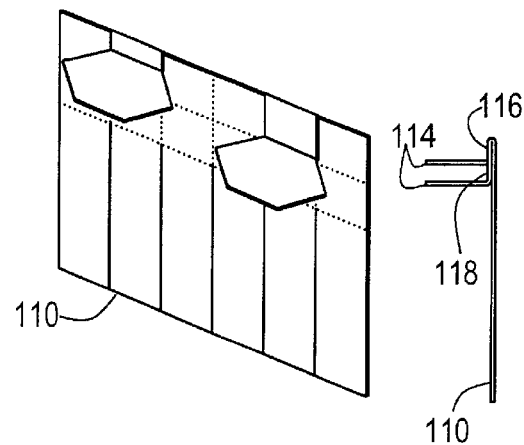
Figure 8E:
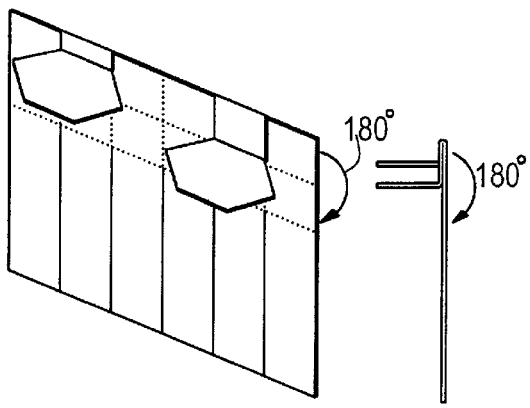
Figure 8F:
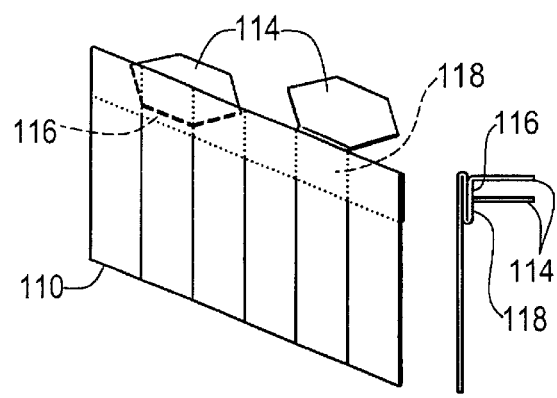
Figure 8H:
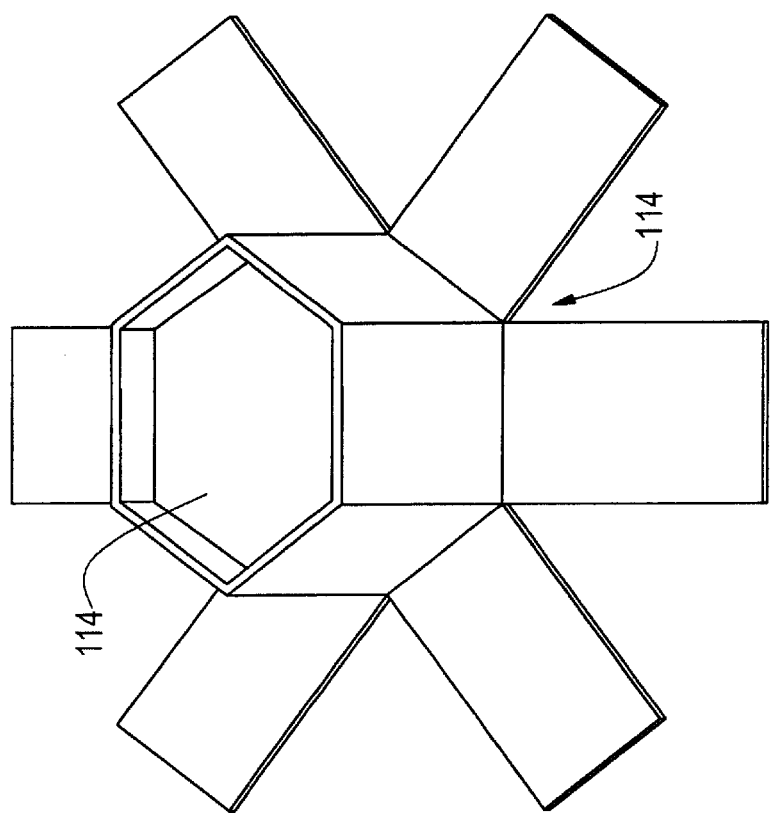
Figure 8G:
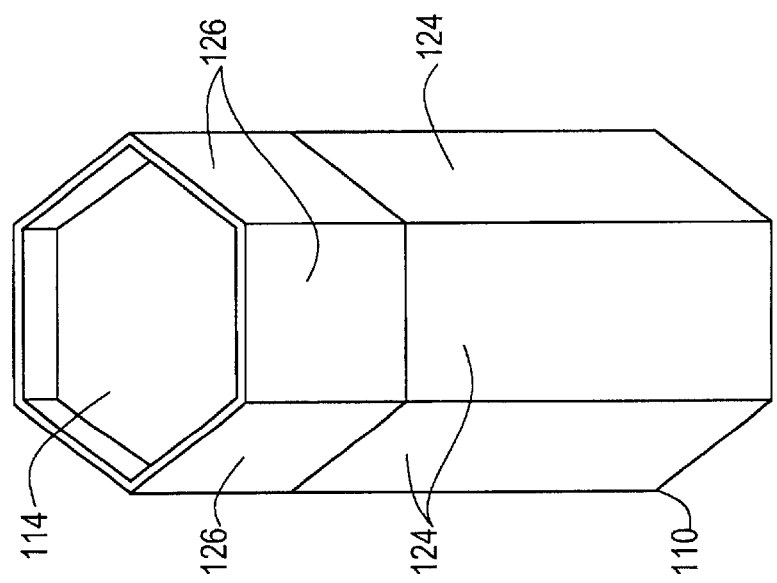

FIGS. 8a–8h show a particular embodiment having polygonal shaped reinforcement panels. Referring to FIGS. 8a and 8b, a sheet of deformable planar material 40 is cut to form a plurality of portions 110. A waste area 112 between the portions 110 is discarded. Each of the portions 110 has at least one integral polygonal reinforcement panel 114. The reinforcement panels 114 are continuous with the portions 110 via spacer legs 116, 118. The spacer legs include short spacer legs 116 and long spacer legs 118, and vary in length to offset and accommodate a plurality of the reinforcement panels as will be described below. Referring to FIGS. 8c, 8d and 8e, the reinforcement panels 114 are deformed at the corresponding spacer leg 116, 118 to dispose the reinforcement panels 114 perpendicular to the portion 110 at offset heights as defined by the spacer legs 116 and 118. Referring to FIGS. 8f, 8g and 8h, the portion 110 is deformed into a polygonal shape as described above to define opposed wall surfaces 126. A plurality of legs 124 defined by each of the sides of the polygon is then deformed outward to provide an attachment surface to an object to be rotated.

Figure 9A:
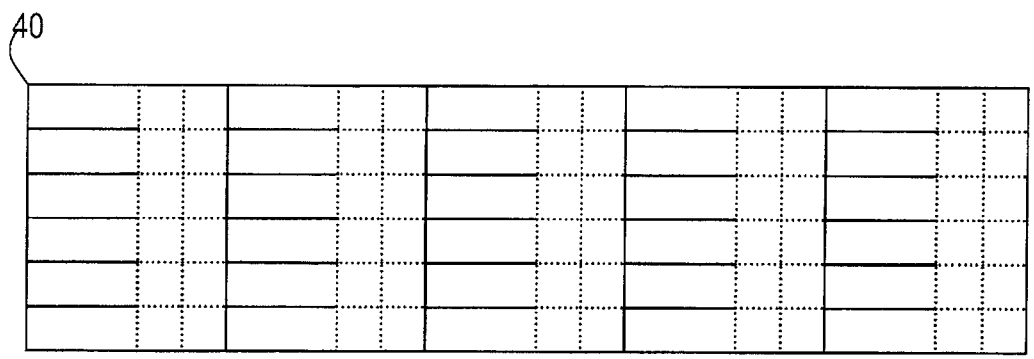
FIGS. 9a–9f show another embodiment having a strengthening bar and cut from a continuous, repeatable pattern.
Figure 9B:
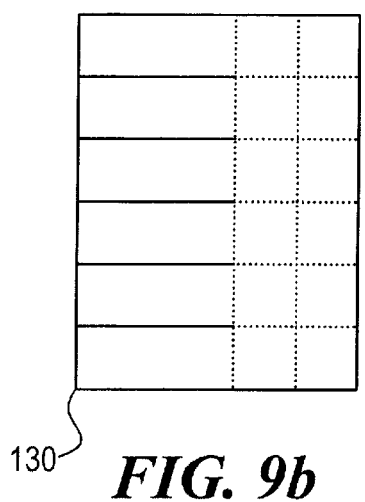
Figure 9C:
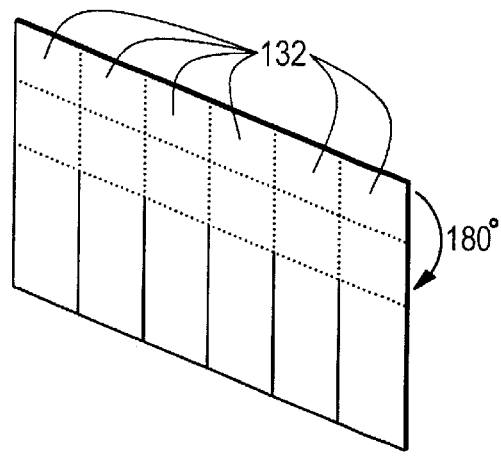
Figure 9D:
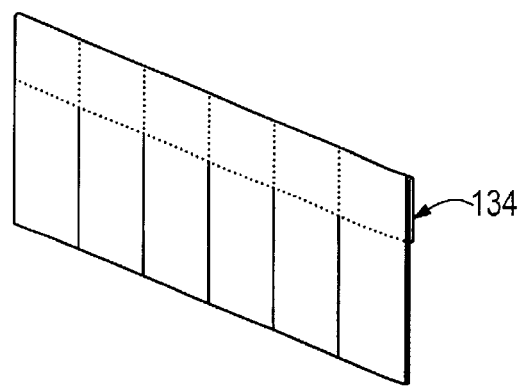
Figure 9F:
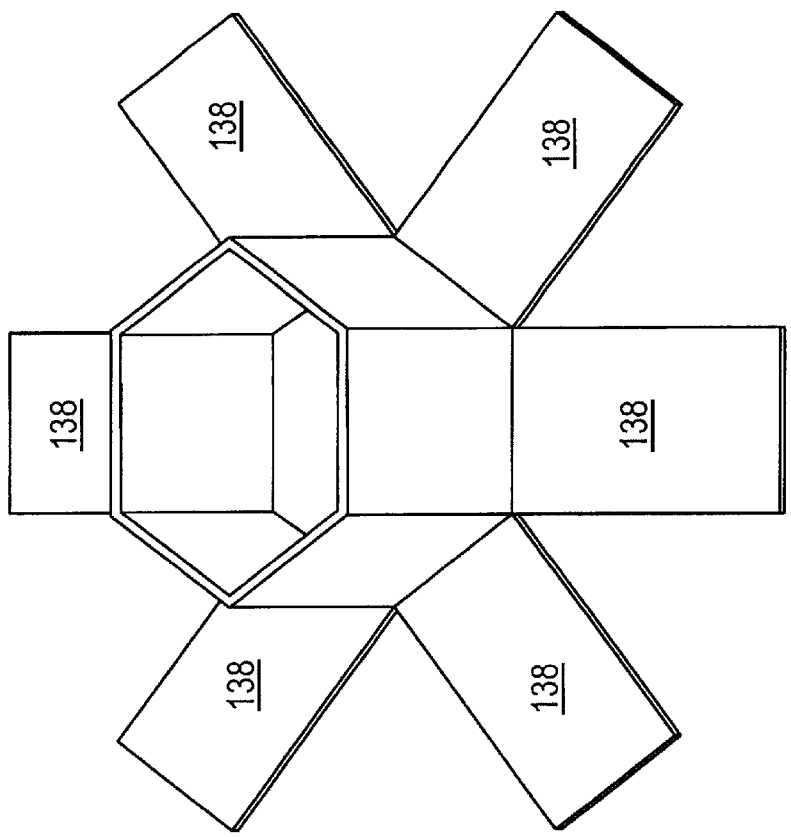
Figure 9E:
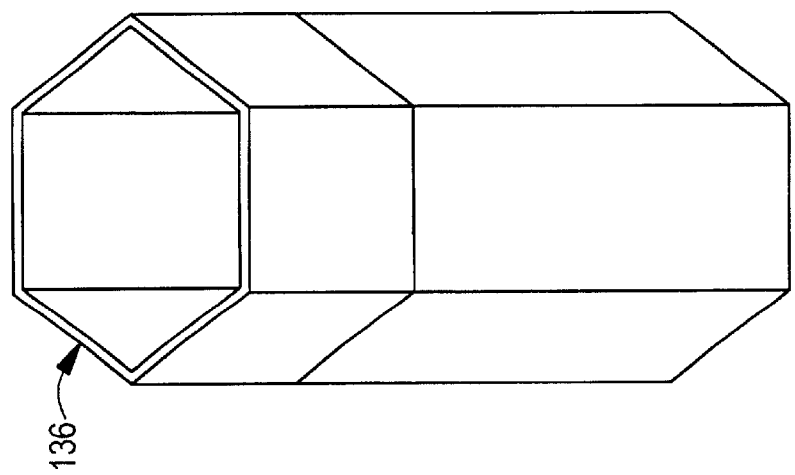

FIGS. 9a–9f show another embodiment cut from a continuous, repeatable pattern and having double wall segments. Referring to FIGS. 9a and 9b, a continuous, repeatable pattern similar to that of FIG. 6a is cut in a sheet of deformable planar material 40 to yield a cut portion 130. Double wall segments 132, continuous and integral with the portion 130, are each folded 180° to form a double wall 134. The double wall is then deformed as above into a polygonal shape such as a hexagon 136. The legs 138 are then deformed at the edge of the double wall 134 to provide an attachment surface to a rotatable object.

Figure 10C:
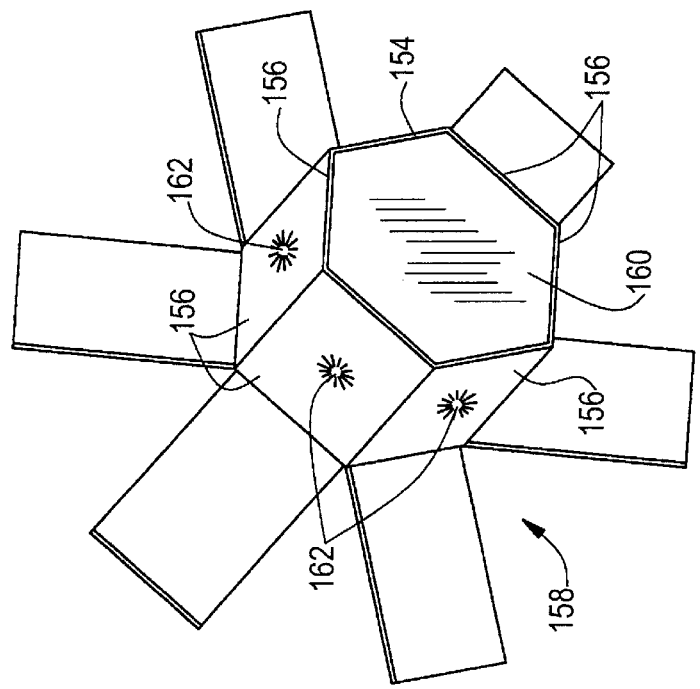
FIGS. 10a–10c show another embodiment in which a solid strengthening member is inserted in the interior of the polygon.
Figure 10A:
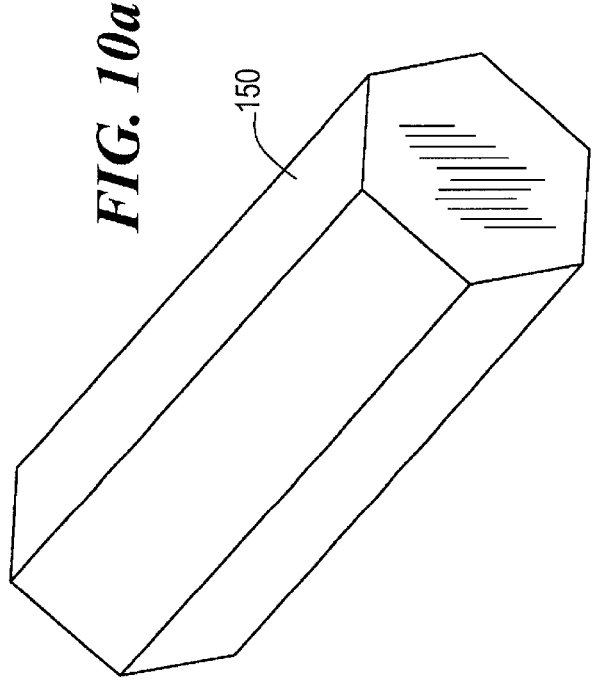
Figure 10B:
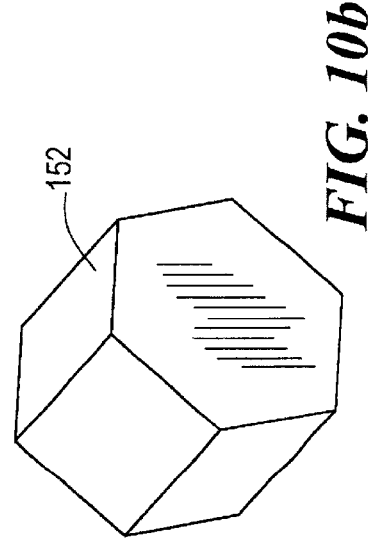

FIGS. 10a–10c show another embodiment in which a solid strengthening member is inserted in the interior of the resulting polygon. Referring to FIGS. 10a–10c, an elongated metal rod 150 has a polygonal cross-section such as a hexagon. The rod 150 has a diameter slightly smaller than that defined by the opposed sides 156 of the engageable member 158 so as to be slideably inserted in close tolerance with the opposed sides 156. A portion 152 is cut off of the rod 150, typically a length less than the diameter of the rod 150. The portion 152 is inserted in the interior of the polygon 154 defined by the opposed sides 156 of the engageable member 158 to form a solid strengthening member 160. The solid strengthening member 160 is secured to the interior of the polygon 154 by any suitable attachment such as spot welds 162. The solid strengthening member 160 therefore provides support to the engageable member 158 to resist compression and shear forces as the engageable member 158 is engaged and rotated.

Figure 11A:
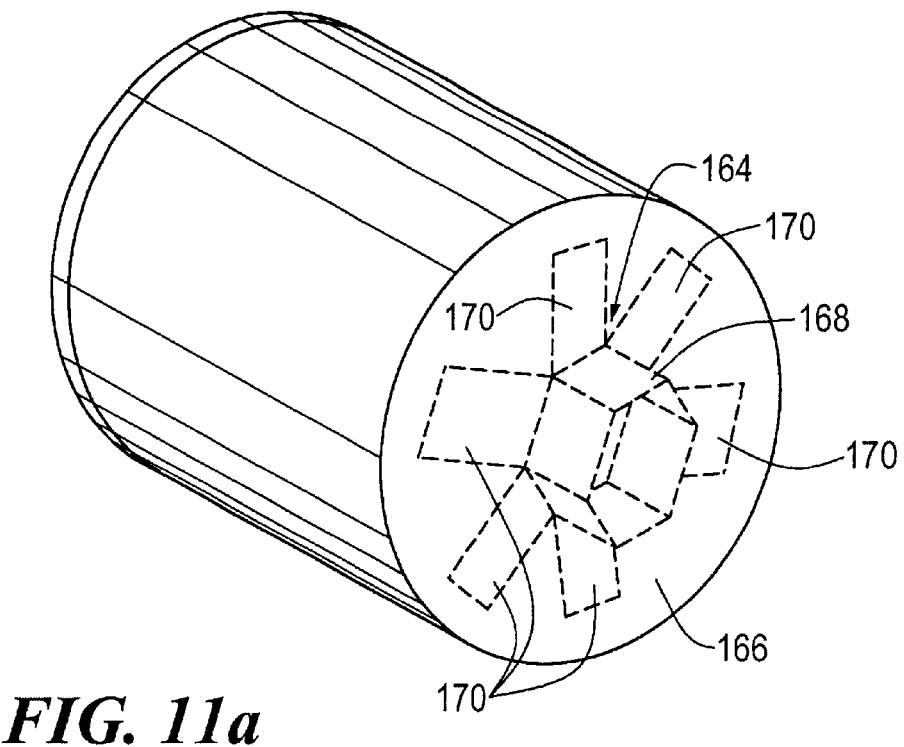
FIGS. 11a–11c show another embodiment in which the engageable member is disposed inside a concave hex cavity on the interior of an oil filter.
Figure 11B:
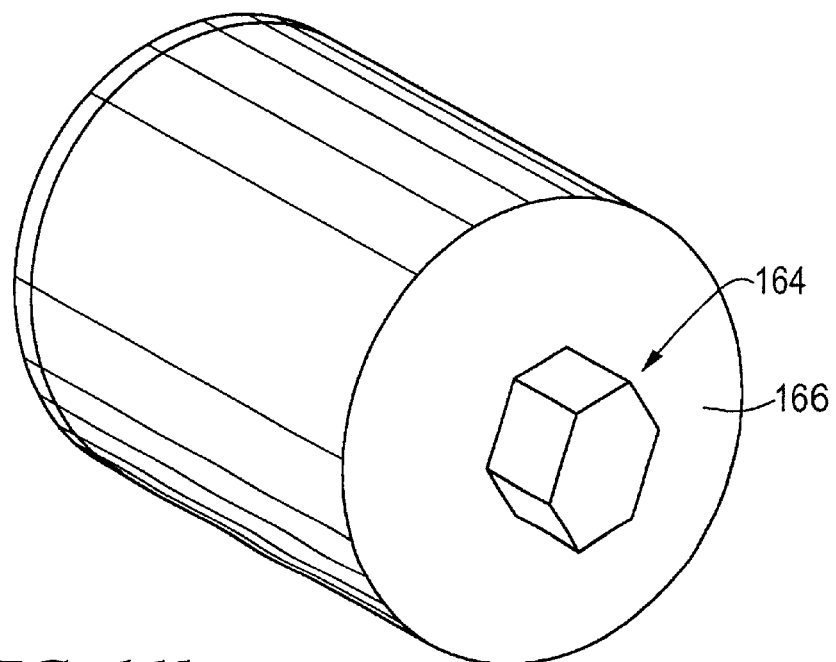
Figure 11C:
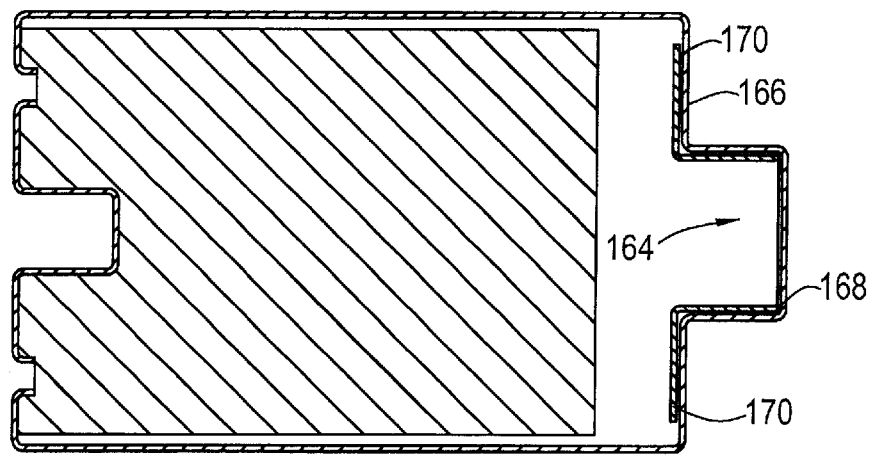
Figure 12A:
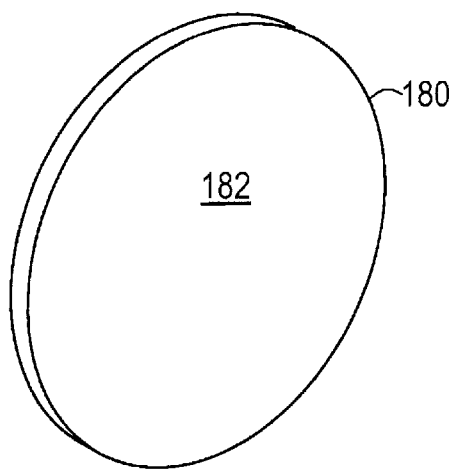
FIGS. 12a–12d show another embodiment including an intermediate attachment surface.
Figure 12B:
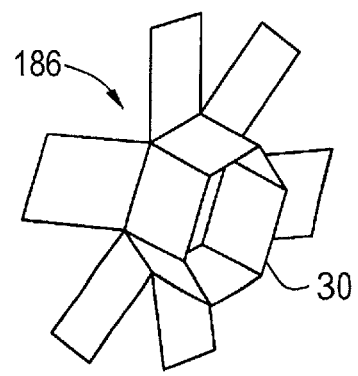
Figure 12C:
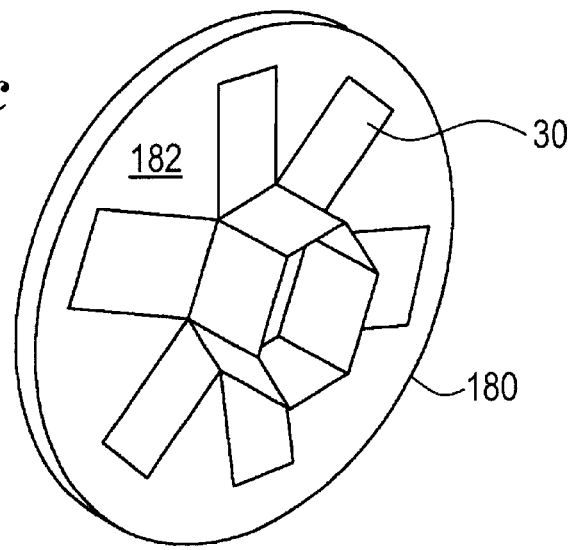
Figure 12D:
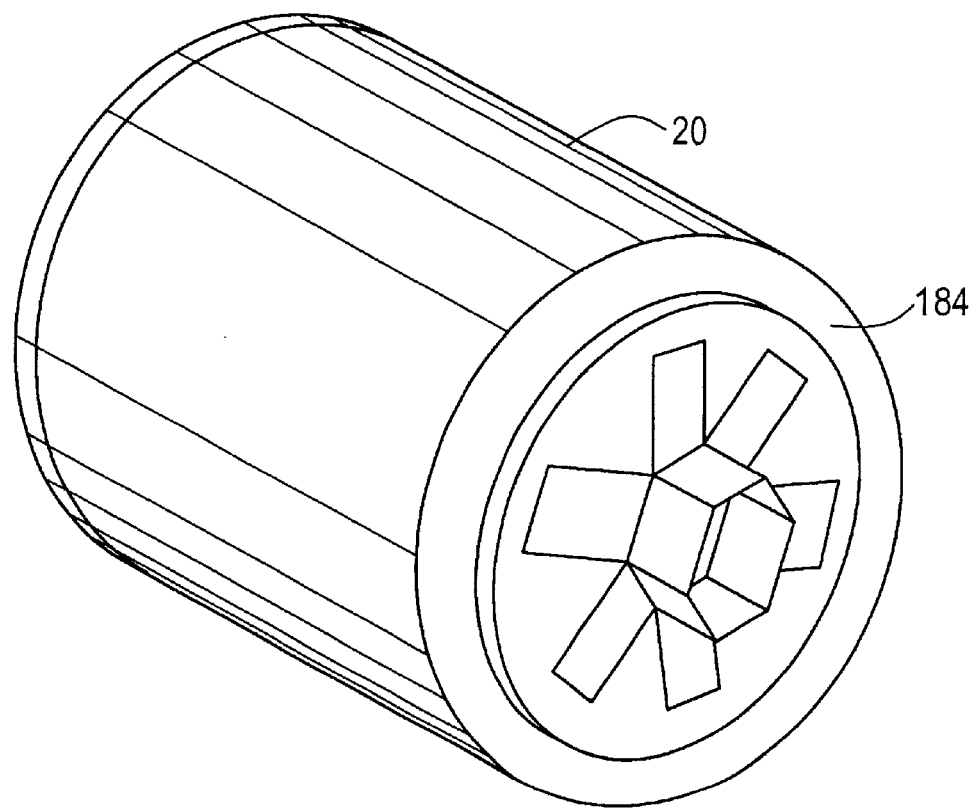

FIGS. 11a–11c show another embodiment in which the engageable member is disposed inside a concave cavity on the interior of an oil filter. Referring to FIGS. 11a–11c, a concave polygonal shaped cavity is formed on one end of an attachment surface 166 such as the closed end of an oil filter. The concave cavity is slightly larger and of a similar shape to the polygon defined by the opposed sides of the engageable member 168. The engageable member 168 is inserted such that the opposed sides are in close tolerance with the sides of the concave cavity 164. The engageable member is attached to the attachment surface 166 via one or more legs 170. In this manner the opposed sides of the engageble member form a double wall surface with the sides of the polygonal cavity so as to absorb shear and compressive forces when engaged.

FIGS. 12a–12d show another embodiment including an intermediate attachment surface. The intermediate attachment surface 180 is adapted to mate with the attachment surface of the engageable member using any suitable embodiment described above, such as the engageable member 30 shown in FIG. 2d. The intermediate attachment surface 180 has a greater attachment area 182 than the attachment surface 184 of the engageable member 30. In this manner, the engageable member 30 may be attached to the intermediate attachement surface 180, and then the intermediate attachment surface may be attached to the rotatable object 20 such as an oil filter. Since the intermediate attachment surface 180 has a greater attachment area 182, it provides greater torque to be transferred from the engageable member 30 to the rotatable object 20. Attachment methods which may have compromised the surface of the rotatable object 20, such as welding, may now be distributed over a larger area 184 on the rotatable object 20.

FIGS. 13a–13c show the intermediate attachment surface having an aperture formed from cut-out flaps. Referring to FIGS. 13a–13c, a star shaped cutout 188 is made in the intermediate attachment surface 180. The star defines the cut-out flaps 190, which are deformed substantially perpendicular to the intermediate attachment surface. The cut-out flaps are then attached to the engageable member 30. In this manner, a greater attachment surface area on the engageable member is effected.

While this invention has been particularly shown and described with references to preferred embodiments thereof, it will be understood by those skilled in the art that various changes in form and details may be made therein without departing from the scope of the invention encompassed by the appended claims. Accordingly, the invention is not intended to be limited except by the following claims.

What is claimed is:

1. A method of forming an engageable member on a threadably attachable object for rotationally detaching the threadedly attachable object from securement to a threaded pedestal, the threadably attachable object being cylindrical having circular end surfaces and an annular side surface and operable to be rotated along the circular axis of the rotatable object, the circular axis concentric with the threads on the threadably attachable object, further comprising:

providing a continuous, rigid, deformable planar material;

defining a predetermined pattern applicable to the deformable planar material to identify a central hub portion surrounded by continuous, integral radial portions extending radially from the central hub, the predetermined pattern further indicative of demarcation lines between the central hub and each of the continuous integral radial portions, the demarcation lines further subdividing each of the continuous integral radial portions into a member side portion and an elongated leg portion;

cutting the deformable planar material according to the predetermined pattern;

deforming the planar material substantially perpendicularly along the lines of demarcation between the central hub portion and each of the continuous integral radial portions, the lines of demarcation defining the central hub portion as a polygon, each of the elongated leg portions extending linearly from the corresponding central hub portions of the respective continuous integral radial portion such that an edge of each of the member side portions is substantially perpendicular to the central hub portion and parallel to an edge of an adjacent member side portions, the member side portions defining a central hub protrusion for engaging a receptacle;

deforming, in a substantially perpendicular manner opposed to the deforming along the lines of demarcation between the central hub portion and the integral radial portions, each of the integral radial portions along the lines of demarcation between the member side portions and the elongated leg portions such that the elongated leg portions extend radially from the central hub protrusion and substantially coplanar with the central hub portion along an end surface of the threadably attachable object, and the member side portion extending along an adjacent side of the threadably attachable object;

attaching, via an attachment mechanism, the elongated leg portions and the member side portions to a surface of the threadably attachable object, the attachment mechanism for transferring rotational forces from the central hub to the threadably attachable object and resistant to shear and compressive forces opposing the attachment of the elongated leg portions to the threadably attachable object; and deforming the elongated legs at an edge around one of the circular ends of the cylindrical, rotatable object such that the elongated legs are disposed in communication with the annular side surface of the rotatable object, wherein the attachment mechanism is spot welding.

2. A method of forming an engageable member comprising:

providing a continuous, rigid, deformable planar material;

defining a predetermined pattern including a central hub, a plurality of member sides, and a plurality of elongated legs each extending from a respective member side;

cutting the planar material according to the predetermined pattern;

deforming the planar material such that the plurality of member sides form a plurality of substantially opposed sides defining the central hub adapted to engage a receptacle, wherein the cutting according to the predetermined pattern includes an integral attachment surface defined by the elongated legs adapted to be secured via an attachment to a rotatable object, the integral attachment surface adapted to distribute rotational forces from the central hub across the rotatable object;

deforming the planar material at a line of demarcation between each of the member sides and corresponding elongated legs defined by the predetermined pattern, such that the elongated legs are disposed along the surface of the rotatable object; and disposing the central hub on the rotatable object centered along a rotational axis defined by the intended rotational engagement of the rotatable object; and attaching, via the attachment, the integral attachment surface defined by the elongated legs to the rotatable object, the attachment for withstanding shear forces between the integral attachment surface and the rotatable object generated from rotation of the central hub, wherein the rotatable object is a threadably attachable cylindrical filter housing having circular end surfaces and an annular side surface and operable to be rotated along the circular axis of the filter housing, the circular axis concentric with the threads on the threadably attachable object, further comprising:

deforming the elongated legs at an edge around one of the circular ends of the cylindrical, rotatable object such that the elongated legs are disposed in communication with the annular side surface of the rotatable object, wherein the attachment mechanism further comprises a series of attachments along each of the elongated legs, the series of attachments disposed on one of the circular end surfaces and on the annular side surface, the attachments comprising spot welding.

3. A method for forming an engageable protrusion on a threadably attachable rotatable object operable to be engaged by a receptacle and adapted for attachment to the rotatable object for rotationally securing and detaching the rotatable object via rotation around an axis comprising:

forming a predetermined pattern on a deformable planar material, the predetermined pattern defining a central hub portion and a plurality of elongated radial portions extending radially from the central hub portion;

cutting the deformable planar material according to the predetermined pattern;

deforming each of the elongated radial portions of the deformable planar material along a line defined by the central hub portion such that the elongated radial portions extend substantially parallel to other elongated radial portions and substantially perpendicular to the central hub portion;

subdividing each of the elongated radial portions, into an opposed side portion, a coplanar attachment surface, and a sidewall attachment surface;

deforming each of the elongated radial portions along a line of demarcation between the opposed side portion and the coplanar attachment surface, each of the opposed side portions forming a continuous convex edge with an adjacent opposed side portion and forming a central hub protrusion defined by the central hub portion and each of the opposed side portions, the deforming disposing the coplanar attachment surfaces substantially coplanar with the other coplanar attachment surfaces and extending radially outward from the central hub portion;

further deforming each of the elongated radial portions along a line of demarcation between each of the coplanar attachment surfaces and the sidewall attachment surfaces of the elongated radial portions, the deforming disposing each of the sidewall attachment surfaces substantially perpendicular with the coplanar attachment surfaces of the respective elongated radial portion, each of the sidewall attachment surfaces extending substantially parallel to the opposed side portions and the other sidewall attachment surfaces; and disposing the central hub portion on the rotatable object concentric with an axis of rotation of the rotatable object, such that each of the coplanar attachment surfaces are adjacent to an end surface of the rotatable object substantially normal to the axis of rotation and each of the sidewall attachment surfaces adjacent to an annular sidewall of the rotatable object extending substantially parallel to the axis of rotation.

4. The method of claim 3 further comprising attaching the central hub protrusion and the elongated radial portions to the rotatable object, the attached central hub protrusion operable to apply rotational torque from the central hub protrusion to the rotatable object around the axis of rotation.

5. The method of claim 4 wherein the attaching further comprises a plurality of attachment points to the rotatable object, the attaching further comprising at least one attachment point on each coplanar attachment surface and at least one attachment point on each sidewall attachment surface.

6. The method of claim 5 wherein the attachment points further comprise spot welding.

7. The method of claim 3 wherein each of the continuous convex edges between the adjacent opposed side portions is operable to reinforce the adjacent opposed side portion in a complementary manner.

8. The method of claim 3 wherein the coplanar attachment surfaces correspond to an edge of the rotatable object substantially concentric with an axis of rotation of the rotatable object.

9. The method of claim 3 wherein each of the opposed side portions, the coplanar attachment surfaces, and the sidewall attachment surfaces of each of the elongated radial portions are substantially the same length as the corresponding portions of the other elongated radial portions.

* * * * *